United States Patent
Cao

(10) Patent No.: US 8,002,564 B2
(45) Date of Patent: Aug. 23, 2011

(54) HOUSING OF PORTABLE ELECTRONIC DEVICE

(75) Inventor: Jin-Ti Cao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 42 days.

(21) Appl. No.: 12/630,929

(22) Filed: Dec. 4, 2009

(65) Prior Publication Data

US 2011/0068665 A1    Mar. 24, 2011

(30) Foreign Application Priority Data

Sep. 22, 2009  (CN) .......................... 2009 1 0307439

(51) Int. Cl.
*H01R 4/60* (2006.01)
(52) U.S. Cl. ....................................... 439/205; 439/669
(58) Field of Classification Search .................. 439/206, 439/205, 669, 668
See application file for complete search history.

(56) References Cited

U.S. PATENT DOCUMENTS

| | | | | |
|---|---|---|---|---|
| 4,952,753 | A * | 8/1990 | Hayashi et al. | 174/559 |
| 6,617,536 | B2 * | 9/2003 | Kawaguchi | 200/516 |
| 6,808,404 | B1 * | 10/2004 | Doyle et al. | 439/188 |
| 7,298,320 | B1 * | 11/2007 | Whiteside et al. | 342/357.64 |
| 7,568,954 | B2 * | 8/2009 | Li et al. | 439/668 |
| 7,871,299 | B2 * | 1/2011 | Kawasaki et al. | 439/669 |
| 2009/0291598 | A1 * | 11/2009 | Cheng et al. | 439/668 |

FOREIGN PATENT DOCUMENTS

| EP | 0322515 | * | 9/1988 |
|---|---|---|---|
| GB | 2178603 A | * | 2/1987 |

* cited by examiner

*Primary Examiner* — Xuong Chung Trans
(74) *Attorney, Agent, or Firm* — Altis Law Group, Inc.

(57) ABSTRACT

A housing of a portable electronic device includes a main body, a waterproof structure, and a plug retainer. The main body defines a jack hole therein. The waterproof structure is formed on the main body and defines a plurality of waterproof grooves. The plug retainer is received in the waterproof structure and defines a connecting hole and a plurality of draining holes therein. The connecting hole is aligned with the jack hole, and the draining holes guide water entering the plug retainer to flow into the waterproof grooves.

11 Claims, 4 Drawing Sheets

HOUSING OF PORTABLE ELECTRONIC DEVICE

BACKGROUND

1. Technical Field

The present disclosure relates to housings of portable electronic devices, and particularly to a waterproof housing of a portable electronic device.

2. Description of Related Art

Portable electronic devices, such as mobile phones, personal digital assistants (PDA), and laptop computers, are widely used. In use, the portable electronic devices often need to be connected to many accessories, such as earphones, chargers, and Universal Series Bus (USB) cables, etc. Generally, many types of portable electronic device housings define a plurality of jack holes therein for receiving the plugs of the accessories, which can allow liquid such as water to enter the device and cause damage Therefore, there is room for improvement within the art.

BRIEF DESCRIPTION OF THE DRAWINGS

Many aspects of the present housing of a portable electronic device can be better understood with reference to the following drawings. The components in the various drawings are not necessarily drawn to scale, the emphasis instead being placed upon clearly illustrating the principles of the present housing of a portable electronic device. Moreover, in the drawings, like reference numerals designate corresponding parts throughout the figures.

DETAILED DESCRIPTION

Figure 1:
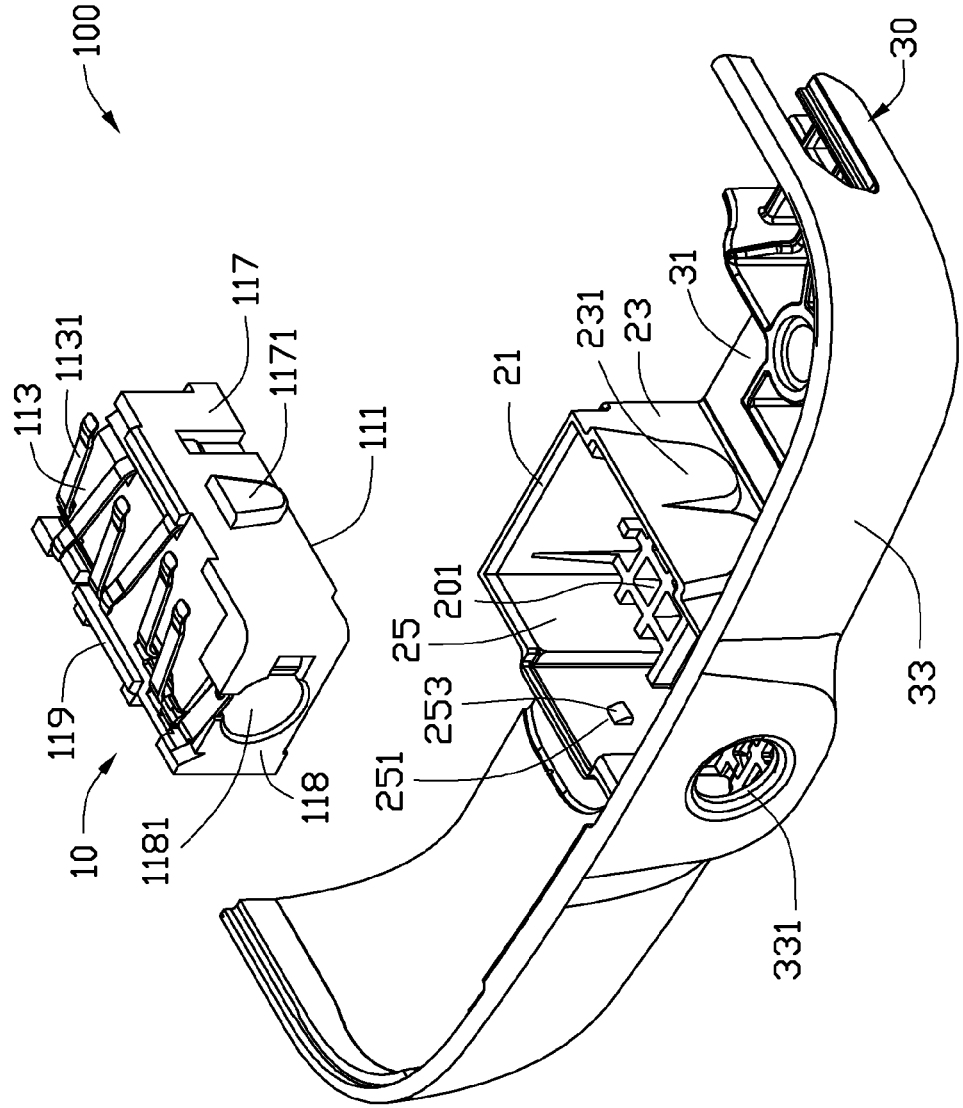
FIG. 1 is a disassembled view of a housing of portable electronic devices, according to a first exemplary embodiment.
Figure 4:
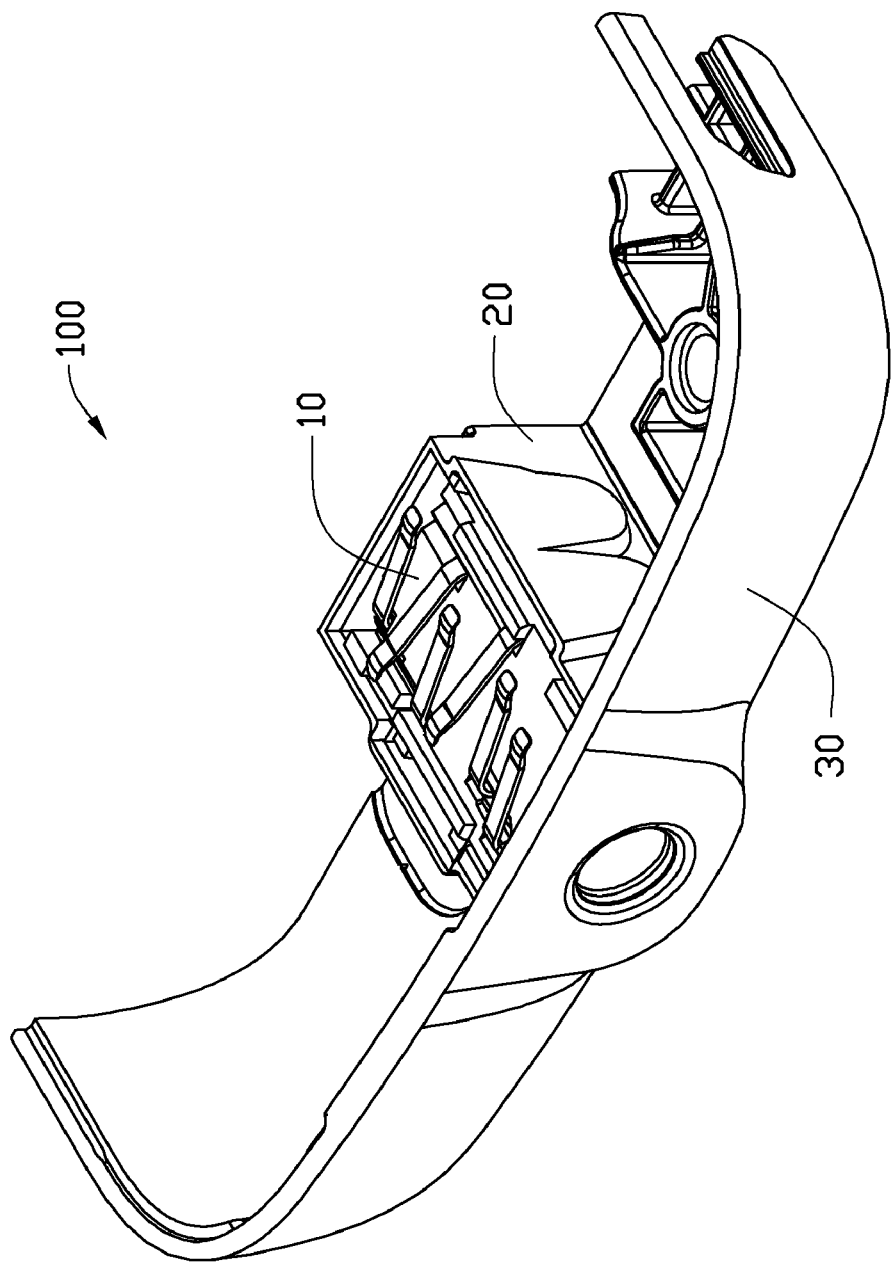
FIG. 4 is an assembled view of the housing shown in FIG. 1.

FIG. 1 shows a housing 100, according to an exemplary embodiment. The housing 100 is used in a portable electronic device, such as a mobile phone, a personal digital assistant (PDA), an MP3/MP4 players, etc. Referring to FIG. 4, the housing 100 includes a plug retainer 10, a waterproof structure 20, and a main body 30.

Figure 2:
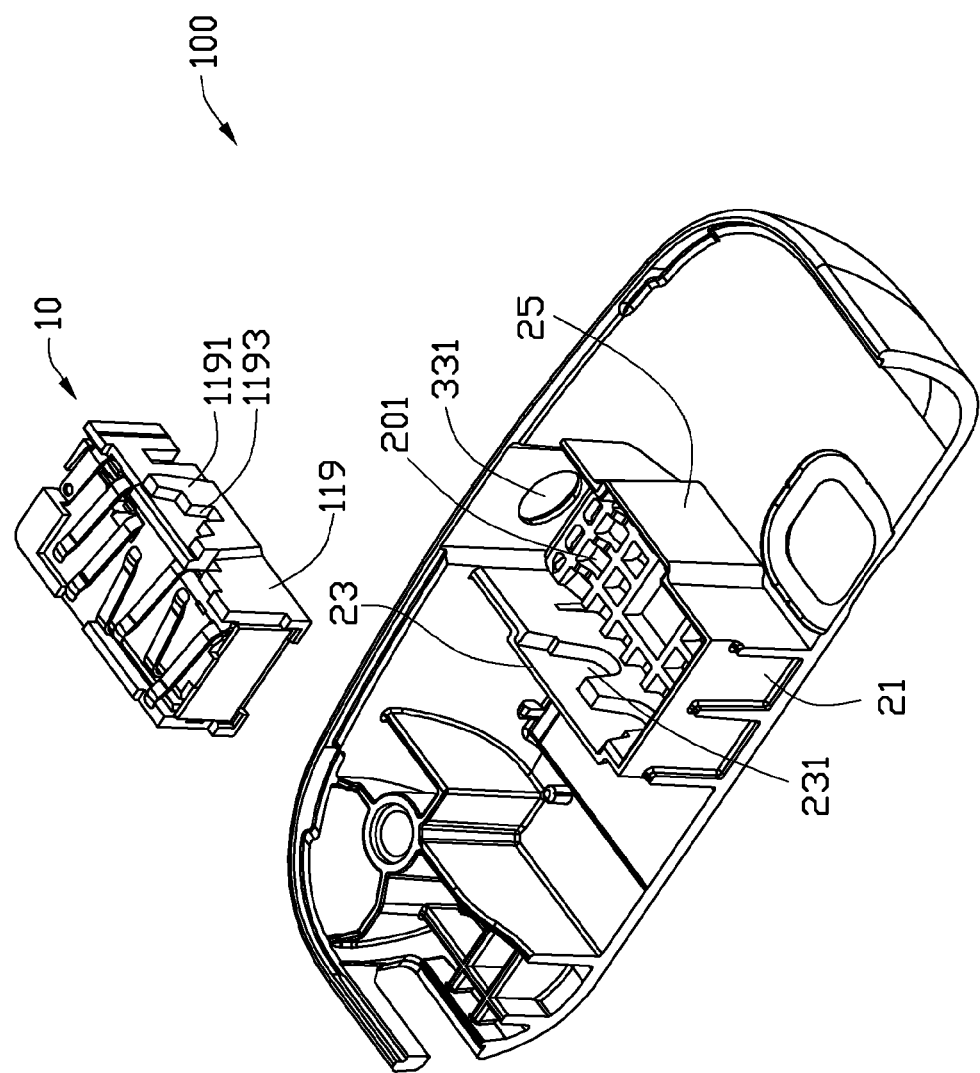
FIG. 2 is a similar to FIG. 1, but shown from another viewing angle.
Figure 3:
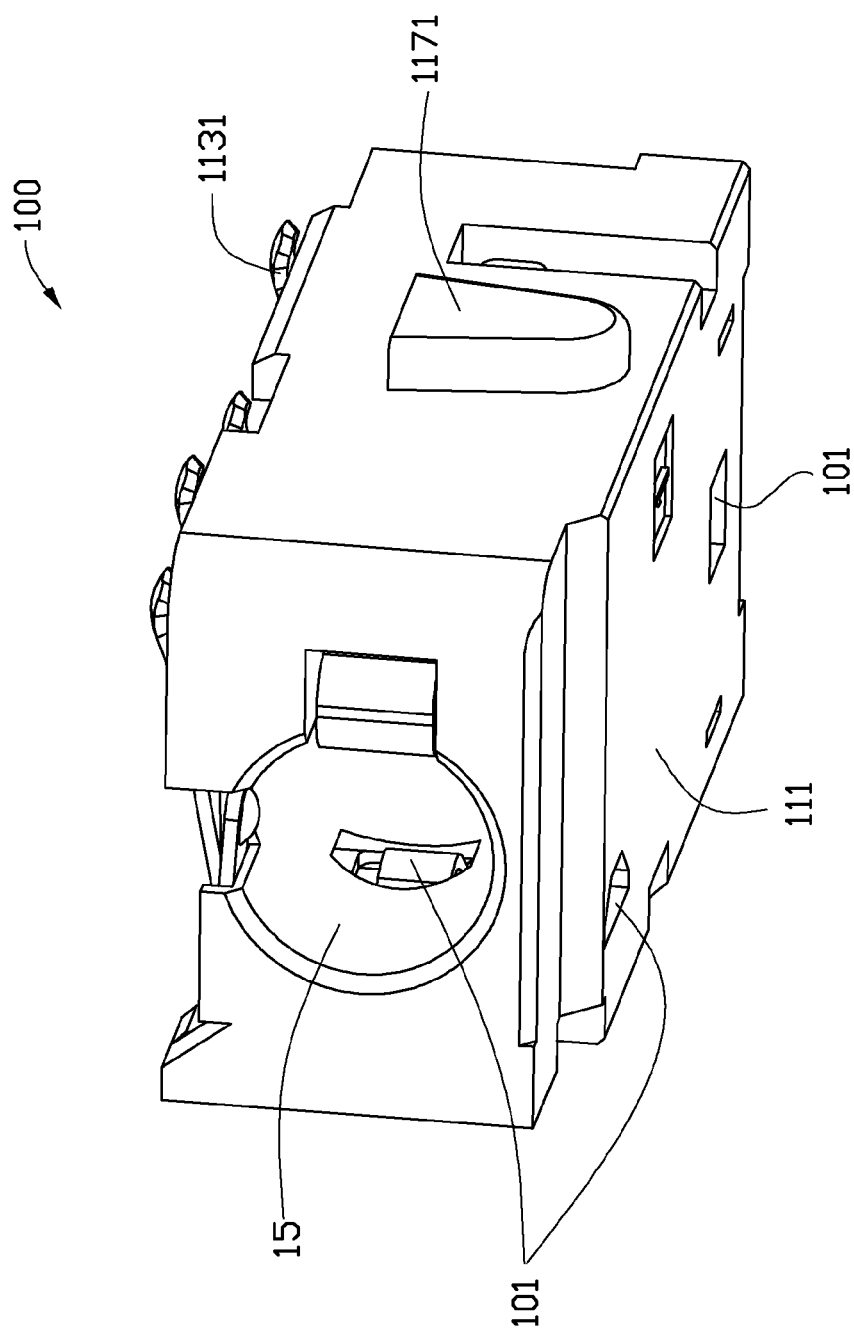
FIG. 3 is a schematic view of a connector retainer of the housing shown in FIG. 1.

Also referring to FIG. 2 and FIG. 3, the plug retainer 10 is a case including a base panel 111, a top panel 113, a first side panel 117, a second side panel 118, and a third side panel 119, which may all be planar sheets. The base panel 111 is positioned parallel to the top panel 113, and the first side panel 117, the second side panel 118 and the third side panel 119 are perpendicularly connected between the base panel 111 and the top panel 113. The first side panel 117 is positioned parallel to the third side panel 119, and the second side panel 118 is perpendicularly mounted between the first side panel 117 and the third side panel 119.

A plurality of connectors 1131 are formed on the outside surface of the top panel 113 and extend to the inside surface of the top panel 113. A retaining protrusion 1171 is formed on the outside surface of the first side panel 117. The second side panel 118 defines a connecting hole 1181 therethrough. An assembling protrusion 1191 is formed on the outside surface of the third side panel 119, and the assembling protrusion 1191 defines a holding groove 1193 therein. The base panel 111, the first side panel 117, and the third side panel 119 further define a plurality of draining holes 101 therethrough.

The main body 30 can be a conventional housing of the portable electronic device. The main body 30 includes a planar base board 31 and a frame 33 perpendicularly connected to the periphery of the base board 31. The frame 33 defines a jack hole 331 corresponding to the connecting hole 1181 therethrough.

The waterproof structure 20 is formed on the main body 30, and the frame 33 and the waterproof structure 20 are positioned on a same side of the base board 31. The waterproof structure 20 includes a plurality of waterproof grooves 201, a first side wall 21, a second side wall 23 and a third side wall 25. The waterproof grooves 201 are defined in the base board 31 and are positioned adjacent to the jack hole 331. A depth of each waterproof groove 201 should be about 1.0 or more millimeters, and an area of the opening of each waterproof groove 201 should be about 1.0 square mm or less.

The first side wall 21, the second side wall 23, and the third side wall 25 are all planar sheets perpendicularly connected to the base board 31, and the waterproof grooves 201 are surrounded by the first side wall 21, the second side wall 23, and the third side wall 25. The second side wall 23 is positioned parallel to the third side wall 25, and the first side wall 21 is perpendicularly connected between the second side wall 23 and the third side wall 25. The second side wall 23 and the third side wall 25 are also perpendicularly connected to the inside surface of the frame 33, and the jack hole 331 is positioned between the second side wall 23 and the third side wall 25. The second side wall 23 defines a retaining groove 231 therein. The retaining groove 231 opens on an inside surface of the second side wall 23 and corresponds to the retaining protrusion 1171. The inside surface of the third side wall 25 is partially recessed to define an assembling groove 251 corresponding to the assembling protrusion 1191 therein. A holding protrusion 253 corresponding to the holding groove 1193 is formed on the inside surface of the third side wall 25.

In assembly, the plug retainer 10 is received in the waterproof structure 20. The base panel 111 is positioned towards the waterproof grooves 201. The connecting hole 1181 is aligned with the jack hole 331. The retaining protrusion 1171 is held in the retaining groove 231. The assembling protrusion 1191 is received in the assembling groove 251, and the holding protrusion 253 is held in the holding groove 1193. Thus, the plug retainer 10 is assembled to the housing 30. The connectors 1131 on the top panel 113 are exposed away from the waterproof structure 20.

In use, a plug (not shown) is inserted into the jack hole 331 and the connecting hole 1181 and held in the plug retainer 10. The inner circuits (not shown) of the portable electronic device can be connected to the plug by the connectors 1131. Should liquid enter the plug retainer 10 from the jack hole 331 and the connecting hole 1181, the liquid can be guided by the draining holes 101 to flow into the waterproof grooves 201 through the draining holes 101. Since the size of each waterproof groove 201 is small, the water can be absorbed in the waterproof grooves 201 due to capillarity. Therefore, the plug, the connectors 1131 and the inner circuits of the portable electronic device are kept dry.

Additionally, the plug retainer 10 and the waterproof structure 20 can also be in other shapes. In the present disclosure, when the housing 100 is used in a portable electronic device, it can prevent water entering the jack hole 331 from damaging the inner circuits of the portable electronic device and the plugs of accessories connected to the portable electronic device. The housing 100 has a simple structure and does not need expensive materials.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A housing of a portable electronic device, comprising:
a main body defining a jack hole therein;
a waterproof structure formed on the main body, the waterproof structure defining a plurality of waterproof grooves therein; and
a plug retainer received in the waterproof structure, the plug retainer defining a connecting hole and a plurality of draining holes therein, the connecting hole aligned with the jack hole for inserting a plug into the plug retainer; wherein the draining holes guide liquid entering the plug retainer to flow into the waterproof grooves, and the liquid is absorbed in the waterproof grooves due to capillarity, such that inner circuits of the portable electronic device are kept dry.

2. The housing as claimed in claim 1, wherein the housing further includes a frame connected to the main body, and the frame defines the jack hole therethrough.

3. The housing as claimed in claim 2, wherein the waterproof structure includes a first side wall, a second side wall and a third side wall connected to the main body and surrounding the waterproof grooves, the first side wall is connected between the second side wall and the third side wall, and the jack hole is positioned between the second side wall and the third side wall.

4. The housing as claimed in claim 3, wherein the plug retainer includes a base panel, a top panel, a first side panel, a second side panel and a third side panel, and the first side panel, the second side panel, and the third side panel are connected between the base panel and the top panel.

5. The housing as claimed in claim 4, wherein the base panel, the first side panel, and the third side panel define the plurality of draining holes therethrough.

6. The housing as claimed in claim 4, wherein the second side panel defines the connecting hole therethrough.

7. The housing as claimed in claim 6, wherein a retaining protrusion is formed on the first side panel, the second side wall defines a retaining groove corresponding to the retaining protrusion therein, and the retaining protrusion is held in the retaining groove.

8. The housing as claimed in claim 6, wherein an assembling protrusion is formed on the third side panel, the third side wall defines an assembling groove corresponding to the assembling protrusion therein, and the assembling protrusion is received in the assembling groove.

9. The housing as claimed in claim 8, wherein and the assembling protrusion defines a holding groove therein, a holding protrusion corresponding to the holding groove is formed on the third side wall, and the holding protrusion is held in the holding groove.

10. The housing as claimed in claim 1, wherein the plug retainer includes a plurality of connectors formed on an outside surface thereof and extending to an inside surface thereof; the plug inserted in the plug retainer electrically connected to the inner circuits of the portable electronic device through the plurality of connectors, and that the draining holes guide liquid entering the plug retainer to flow into the waterproof grooves and the liquid is absorbed in the waterproof grooves due to capillarity further keeping the plug and the plurality connectors dry.

11. The housing as claimed in claim 1, wherein a depth of each waterproof groove equals or is larger than 1.0 mm, and an area of the opening of each waterproof groove equals or is less than 1.0 square mm, such that the sizes of the waterproof grooves are configured to be small enough to ensure that the liquid is absorbed in the waterproof grooves due to capillarity.

* * * * *